United States Patent [19]

Verge et al.

[11] Patent Number: 5,580,933

[45] Date of Patent: Dec. 3, 1996

[54] THERMOPLASTIC RESINS RESULTING FROM GRAFTING UNSATURATED MONOMERS TO CHLORINATED POLYOLEFINS, AND PROCESS FOR THE PRODUCTION THEREOF

[75] Inventors: Christophe Verge; Alain Boone, both of Bernay, France

[73] Assignee: Elf Atochem S.A., Puteaux, France

[21] Appl. No.: 476,056

[22] Filed: Jun. 7, 1995

Related U.S. Application Data

[63] Continuation of Ser. No. 120,755, Sep. 15, 1993, abandoned.

[30] Foreign Application Priority Data

Sep. 15, 1992 [FR] France .................................. 92 10975

[51] Int. Cl.⁶ ........................................... C08F 259/02
[52] U.S. Cl. ..................... 525/301; 525/293; 525/303; 525/305; 525/309
[58] Field of Search ..................... 525/301, 303, 525/309, 293, 305, 292

[56] References Cited

U.S. PATENT DOCUMENTS

| | | | |
|---|---|---|---|
| 4,774,280 | 9/1988 | Hauschild et al. | 524/533 |
| 4,917,734 | 4/1990 | Demay et al. | 106/270 |

FOREIGN PATENT DOCUMENTS

| | | |
|---|---|---|
| 0138224 | 4/1985 | European Pat. Off. . |
| 0226387 | 6/1987 | European Pat. Off. . |
| 135622 | 5/1979 | Germany . |
| 58-071966 | 4/1983 | Japan . |
| 58-176208 | 10/1983 | Japan . |

OTHER PUBLICATIONS

K. Middleton, Coatings for Polypropylene and Other Selected Substrates, Polymers Paint Colour Journal, Jan., 1988, vol. 178, pp. 16, 17 and 24.

J. P. Goulin, "Les Polyolefines Chlorees Eastman et leur Utilisation Pour Ameliorer l'adherence sur Polypropylene et Autres Matieres Plastiques", Double Liaison–Chime des Peintures No. 349, pp. 512–515, Nov., 1984.

Chemical Abstracts, vol. 99, p. 94, Abstract No. 99:196738h "Coating Compositions" 1983.

*Primary Examiner*—Vasu S. Jagannathan
*Attorney, Agent, or Firm*—Burns, Doane, Swecker & Mathis, L.L.P.

[57] ABSTRACT

Grafting chlorinated polyolefins with unsaturated monomers (acrylic, styrene, vinyl) in the presence of AIBN used as a free radical-producing trigger yields resins that can be used as solutions, dilutable in water as required, in order to produce films that are hard, transparent, glossy, and adhesive and which are prized, in particular, in the manufacture of compositions used for pigmented or unpigmented coatings such as paints, inks, and adhesive primary coatings.

15 Claims, No Drawings

THERMOPLASTIC RESINS RESULTING FROM GRAFTING UNSATURATED MONOMERS TO CHLORINATED POLYOLEFINS, AND PROCESS FOR THE PRODUCTION THEREOF

This application is a continuation of application Ser. No. 08/120,755, filed Sep. 15, 1993 abandoned.

The present invention relates to new thermoplastic resins obtained by grafting unsaturatedacrylic, styrene, or vinyl monomers to chlorinated polyethylene. It also concerns the method used to produce these Yesins, as well as their use as binding agents for pigmented or unpigmented coatings, such as paints, inks, and adhesive primary coatings.

The pigmented/unpigmented coatings industry, and, more generally, the polymer coatings industry, requires that film-forming compositions making up the basic constituent of these products exhibit, on the one hand, film-like properties specific thereto, and, on the other, properties which may be termed optional and which vary depending on their mode of use. The first group includes adhesiveness to the support, flexibility and strength, transparency, gloss, and hardness, which must be present no matter what properties are claimed for the second group, such as solubility, dilutability, hydrodispersibility, etc.

Copolymerization of acrylic comonomers among themselves or with other monomers, such as styrene, makes it possible to produce film-forming copolymers having a wide range of vitreous transition temperatures (Tg). Accordingly, through the copolymerization alone of styrene and butyl methacrylate, a Tg range of between 20° C. and 100° C. is encompassed. By adding other comonomers, certain useful functions are imparted to the copolymer; e.g., making the copolymer hydrosoluble or hydrodispersible, by virtue of its partial copolymerization with hydrophilic monomers, such as hydroxyethyl methacrylate.

Conventional practice provides for improving film flexibility, and, in particular, its adhesion to various supports, by combining acrylic copolymers with other suitably-chosen polymers, such as oxidized or unoxidized polyethylenes, or else chlorinated polyolefins. The latter are widely known for their adhesiveness to various supports, even those, like polypropylene, which make adhesion difficult. They are found in formulations for adhesive primary coatings or, quite simply, in paints and varnishes (see, for example, J. P. Goulin, "Polyoéfines chlorées Eastman et leur utilisation pour améliorer l'adhérence sur polypropylene et autres mati eres plastiques," ["Eastman Chlorinated Polyolefins and Their Use to Improve Adhesion to Polypropylene and Other Plastic Materials"], *Double Liaison*, No. 349, 512, 1984; or K. Middleton, "Coatings for Polypropylene and Other Selected Substances," *Pol. Paint Colour Journal*, 178, 16 1988). Simple mixtures of polymers sometimes entail incompatibility problems, thereby causing loss of adhesiveness and gloss.

However, a better result is obtained by grafting unsaturated monomers to the polymer. Thus, prior art encompasses various grafted resins, e.g., grafted oxidized polyethylenes, as disclosed by French Patent Application No. FR-A-2597489, grafted unoxidized polyethylenes or ethylene copolymers mentioned in European Patent Application No. EP-A-0313467, and chlorinated polyolefins grafted using methyl methacrylate, in accordance with Japanese Patent Application No. JP58071966. Nevertheless, there is no evidence making it possible to ensure the physical properties of the products derived from these grafting procedures, for which the results, in particular adhesiveness and gloss, vary considerably not only as a function of the nature and proportion of the comonomers used, but also of the nature of the polymerization trigger, the grafting temperature, and, generally speaking, all of the conditions under which the operation is effected.

The problem confronting the Applicant was the production of resins which would be simultaneously transparent, hard and glossy and which would possess good adhesiveness on various supports, in particular, on stainless steel, glass, wood, polyamide, and even polypropylene. Another problem concerned resins of this kind whose organic solutions would, for the purposes of application, be hydrodispersible. The problem was solved by means of resins obtained from a grafting reaction between 5–20% chlorinated polyolefin and 80–95% unsaturate monomers, such as acrylic, vinyl, or styrene monomers, this reaction being carried out under conditions to be detailed below.

The chlorinated polyolefins that can be used according to the invention are characterized by an average molecular weight of between 8,000 and 140,000, and a chlorine content of between 15% and 40%.

The group of unsaturated monomers to be used singly or, more generally, in mixtures, is divided into oil-absorbing or neutrophilic monomers, such as styrene and alkyl acrylates and methacrylates (monomers which, for ease of designation, will be called hydrophobic monomers); and hydrophilic monomers, such as acrylic and methacrylic acid and 2-hydroxyethyl or 2 hydroxypropyl acrylates or methacrylates.

Hydrophobic (non-hydrophilic) monomers normally compose the major portion of the grafted copolymer. It is mainly by means of their balance between "hard" monomers, i.e., those characterized by a high Tg of their homopolymer (Styrene: Tg=100° C.) and "soft" monomers, i.e., those having a low Tg (Butyl methacrylate: Tg=20° C.; butyl acrylate: Tg=50° C.), that the transition temperature Tg of the grafted copolymer can be adjusted, and, therefore, that the optimal compromise regarding flexibility and hardness can be reached. A rule of composition making it possible to reach this kind of compromise is given by Fox's law:

$$1/T_g = S(W^i/T_{gi}),$$

which relates the vitreous transition temperature $T_g$ of a copolymer to those temperatures $T_{gi}$ of the homopolymers which compose it, through their respective gravimetric fractions $W_i$. A good compromise for compositions according to the invention is reached using grafted resins containing styrene in a proportion of 20–60%.

The hydrophilic monomers are utilized when the possibility of dilution of the grafted polymers or their organic solutions in water is contemplated. A distinction is made between two types of monomers: first, neutralizable monomers, whether acidic or alkaline, such as acrylic or methacrylic acid, dimethylaminoethyl acrylate or methacrylate, diethylaminoethyl acrylate or methacrylate, and tert-butylaminoethyl acrylate or methacrylate, which contribute to the capability of putting the copolymer into emulsion as a function of their rate of neutralization and which are indispensable to dispersion of the invention products in water; and second, neutral hydrophilic monomers, such as hydroxyethyl or hydroxypropyl acrylates or methacrylates and diethyleneglycol acrylate or methacrylate, which are optional but substantially facilitate emulsion formation.

The resins according to the invention are thus copolymers comprising from 5 to 20% chlorinated polyolefin and 80 to 95% unsaturated acrylic, styrene, and/or vinyl monomers, which can be divided into hydrophobic monomers, taken singly or in mixtures, and present in a maximum proportion of 95%, and hydrophilic monomers, also taken singly or in mixtures and present in a maximum proportion of 40%. To obtain clearly hydrophilic resins, these formulae are applied to compositions containing from 5 to 10% chlorinated polyolefin, 90–95% insaturate monomers capable of being divided between hydrophobic monomers, taken singly or in mixtures in a maximum proportion of 55%, and hydrophilic monomers, also taken singly or in mixtures in a proportion of from 10 to 40%. However, in formulae in which the decision has been made to use acrylic or methacrylic acid as hydrophilic monomers, the proportion of the latter will be limited to 10–20%, because they are very hydrophilic, their $T_g$ are very high (106° C. and 228° C., respectively), and their excess proportion risks making the grafted polymer both brittle and exaggeratedly hydrophilic. The preferred system is the styrene-butyl methacrylate-methacrylic acid-hydroxyethyl methacrylate system.

The grafter chlorinated polyethylenes according to the invention are prepared using the process described below, which is also encompassed by the invention.

Polymer grafting is conventionally started and maintained using initiators of free radical-producing polymerization, e.g., peroxides (benzoyl, ditertiobutyl, lauryl peroxide), perbenzoates (tertiobutyl perbenzoate), hydroperoxides (dicumyl hydroperoxide), and diazo compounds, such as 2,2'-azobis (isobutyronitrile) or 2,2'-azobis(2-methylbutyronitile). In fact, the invention works satisfactorily only when the reaction is initiated using free radical-producing catalysts having very short half-lives (termed hereinafter grafting catalysts), such as diazo compounds, which are, however, reputed to be only mediocre proton extractors. Because of this very limited half-life (approximately 20 seconds under the conditions of the process), they must be combined with secondary, slower catalysts (called "cooking" catalysts), such as dicumyl or ditertiobutyl peroxide, whose half-lives are between 1 and 2 hours at 140° C. and whose function is to limit the quantity of residual monomers in the final product.

The grafting temperature is also a parameter which has proved to be essential to the quality of the final product. It has thus become evident that this temperature must exceed 125° C., but must be less than, or at most equal to, 140° C., and that it is preferable to work at a temperature of about 135° C.

To produce the resins according to the invention, the procedure is carried out in a reaction vessel under nitrogen atmosphere at atmospheric or low pressure; the vessel is equipped with an effective stirring device (e.g., an anchor agitator). The chlorinated polyolefin is fed into the base of the tank in solution in an organic solvent, e.g., xylene, and, if necessary, an additional solvent. The mixture is heated to the temperature selected for the graft reaction. The monomers and grafting catalyst are then added slowly. The reaction is allowed to continue, then the "cooking" catalyst is added. The reaction is continued, the mixture is cooled, and the reaction vessel is emptied after having added, if necessary, a dilution solvent, e.g., ethyl acetate.

The choice of the solvents used in the invention is generally determined only by ordinary considerations applicable in this field, since the main point is to avoid caking during polymerization and to supply resins which are most frequently in solution, using varying dry extracts. These dry extracts are generally present in a proportion of between 30 and 50%, although no lower limit is actually applied. In the case of compositions intended to be hydrodispersible, ethoxypropanol is, however, preferred both as a general diluting agent and as a vector of the triggering and cooking catalysts. These compositions also fall within the scope of the invention.

Only those resins exhibiting the following basic properties (see the definition below, in the "Examples" paragraph) are considered to conform to the invention: Persoz hardness greater than 200, gloss equal to, or greater than 90, adhesiveness measured by the grid test equal to, or greater than, 2 on all materials, except for polypropylene. The residual monomers content is an additional requirement applied to the final resins, since there is hardly any application in which the presence thereof can be tolerated at a level higher than 0.2%.

These resins form the base of compositions for pigmented/unpigmented coatings, and, in particular, of paints, inks, and adhesive primers, for use on varied metal, glass, or plastic supports.

EXAMPLES

In the following examples, reference is made to different properties specified below, with the method used for their determination.

Viscosity: The viscosity of the resin solutions according to the invention is determined using a Brookfield viscosimeter at 25° C. Values conventionally expressed in millipascals.seconds (centipoises).

Resin-film properties are obtained from films produced by spraying using a pneumatic sprayer for painting resin solutions whose viscosity is adjusted, as required, by adding a solvent; then drying the film at 20° C. under 50% relative humidity.

Hardness: Persoz oscillating hardnesses are measured in accordance with standard NFT-30-016. Measurements are made at 30° C. on films several tens of micrometers thick placed on glass, under an atmosphere having a relative humidity of 70%. The measurement made is that of the hardness of one oscillation of the pendulum, and is expressed in seconds.

Resistance to scratching: Use is made of the conventional Wolf-Wilborn method for determining hardness when scratched (using pencils) in accordance with Standards SNV 37 113, SIS 18 41 87; NEN 5350 or MIL C 27 227.

Adhesiveness: Adhesiveness is measured using a stripping-grid test, in accordance with Standard NFT-30-038 on smooth steel, stainless steel, glass, polypropylene, and polyamide. Adhesiveness is recorded on a scale of 0 to 5, 0 signifying excellent adhesiveness and 5, a lack of adhesiveness.

Gloss: Measurement is made using a 60° and 85° Trigloss Gardner brilliancy meter on dry film placed on a polypropylene and polyamide (polyamide 6) support, in accordance with Standard NFT 30-064.

Transparency: Transparency is evaluated subjectively by direct examination of the reaction product. All reagents used are transparent products; accordingly, a transparency defect in the final product is immediately perceptible (solution of turbid or nacreous resins).

The products according to the invention are frequently supplied as solutions in which they were formulated. Their dry extract is thus a useful characteristic for users. It is also a value used to check the grafting reaction, since a divergence between the theoretical dry extract and the dry extract obtained indicates that one portion of the monomers has not reacted. The dry extract is determined by weighing a sample of approximately 1 gram of resin placed in a calibrated cupel before and after exposure for two hours to a temperature approaching 100° C. in a ventilated oven. It is measured by the ratio of the final to the initial weight, expressed as a percent. As regards the evaluation of the proportions of residual monomers, the measurement of one chromatographic analysis is doubled.

The chlorinated polyolefin used in the following examples is a chlorinated polyethylene whose molar mass is approximately 18,000, whose chlorine content is approximately 30%, and which is supplied as a 50% solution in xylene manufactured by Kodak, under the designation CP 343.

EXAMPLE 1

In a 20-liter reaction vessel in which agitation is achieved by the action of an anchor and a counter-blade and which is equipped with a nitrogen-venting device, the base of the tank is fed with a chlorinated polyethylene solution composed of 1.34 kg of a 50% chlorinated polyolefin solution in xylene (CP 343) and 0.48 kg butyl acetate. The base of the tank is heated to 135° C. under nitrogen, then the following are poured in separately: the mixture of monomers composed of 2.8 kg styrene, 2.9 kg butyl methacrylate, 1.16 kg of 2-hydroxyethyl methacrylate, 0.44 kg methacrylic acid, and the polymerization catalyst, composed of a mixture of 0.04 kg of azoisobutyronitrile and 2.54 kg of butyl acetate. This pouring operation is effected in 2 hours, 30 minutes, the contents of the reaction vessel being kept at 134°–135° C. The cooking catalyst, consisting of 0.06 kg tertiobutyl peroxide and 4.7 butyl acetate, is then poured over approximately one hour. The reaction is allowed to continue for four hours at 135° C. Cooling then takes place at less than 75° C. in order to add the dilution solvent consisting of 3.56 kg ethyl acetate. The mixture is then cooled, and a completely transparent, viscous product exhibiting the following properties is removed:

Dry extract at 90° C.: 43.8%

Transparency: excellent

Proportion of residual monomers: 0.21%

EXAMPLE 2

In this example, comparison is made among the performances of a grafted resin according to the invention (film IV), chlorinated paraffin alone (film I), a styrene/acrylic copolymer alone (film II), and of the simple physical mixture of the chlorinated paraffin and of styrene/acrylic copolymer film (III). The grafted resin is that used in Example 1, above. The styrene/acrylic copolymer was obtained using the same process, but without the addition of chlorinated polyolefin. The film properties obtained are given in the Table below:

| Films | Film I | Film II | Film III | Film IV |
|---|---|---|---|---|
| Thickness (μm) | 36 | 30 | 40 | 22 |
| Persoz hardness (s) | 121 | 259 | 248 | 254 |
| "Pencil" hardness | B | F | HB | F |
| 60°/85/Gloss | | | | |
| on polypropylene | 90/91 | 91/93 | 87/88 | 90/92 |
| on polyamide | 86/92 | 88/93 | 84/89 | 91/94 |

| Films | Film I | Film II | Film III | Film IV |
|---|---|---|---|---|
| Grid | | | | |
| Smooth steel | 0 | 3 | 5 | 0 |
| Stainless steel | 0 | 2 | 5 | 0 |
| Glass | 1 | 5 | 5 | 1 |
| Polypropylene | 0 | 5 | 5 | 5 |
| Polyamide | 0 | 0 | 0 | 0 |

It can be seen that the chlorinated polyolefin alone exhibits a hardness which is less than the hardnesses of the other compositions; that the gloss of the simple mixture of chlorinated polyolefin with the styrene/acrylic copolymer is quite mediocre; and that the adhesiveness of the chlorinated polyolefin is good on all supports, but that this property is preserved for an acceptable part only by grafting, even though an exception was noted on polypropylene, on which this adhesiveness is not expressed under the conditions of the synthesis.

Furthermore, the product resulting from grafting according to the invention is completely transparent, while the physical mixture of the chlorinated paraffin and styrene/acrylic copolymers are nacreous products; this fact would have only a limited effect on the transparency of the thin films if it did not impair the gloss.

EXAMPLE 3

A resin was produced in accordance with Example 2, except for the fact that use is made, not of 3.65 kg of ethyl acetate, but of the same weight of xylene as the dilution solvent. The basic properties of the resin composition thus obtained were not perceptibly altered, but the result of the grid test on polypropylene went from 5 to 2–3. It is the proportion of aromatic solvent (35% of the solvent) which is held to be responsible for the enhanced role of the chlorinated polyolefin in increasing adhesiveness of the grafted polymer on polypropylene.

EXAMPLE 4

The tests described reveal the influence of the grafting temperature. The tests were effected under the conditions applied in Example 1, using sometimes 2,2-azobis(isobutyronitrile) (AIBN), and sometimes benzoyl peroxide (POBz) as the triggering catalyst. The following results were obtained:

| Catalyst | Grafting Temperature | Results |
|---|---|---|
| AIBN | 80° C. | Brittle film showing poor adhesiveness |
| AIBN | 125° C. | Film turbid, nacreous |
| AIBN | 80° C. | Brittle film showing poor adhesiveness |
| POBz | 125° C. | Film turbid, nacreous |
| AIBN | 140° C. | Film transparent, adhesive, flexible |

EXAMPLE 5

This example illustrates the way in which the proportion of residual monomers can be reduced in the final product according to the invention.

The grafting reaction was carried out in accordance with Example 1. In a comparative test, the trigger and cooking catalyst consisted of AIBN. The result was 42.2% dry extract resin giving a film having good transparency and excellent gloss, whose proportion of residual monomers was 1.2% (styrene=0.4%, butyl methacrylate=0.7, hydroxyethyl methacrylate+methacrylic acid less than or equal to 0.2%). In the following test, the trigger was AIBN and the cooking catalyst, ditertiobutyl peroxide. The result was a resin producing a film which had both good transparency and excellent gloss, and whose total proportion of residual monomers had a satisfactory value, i.e., 0.25%.

We claim:

1. A film forming grafted copolymer, comprising; (a) at least one chlorinated polyolefin grafted with (b) unsaturated hydrophobic monomers styrene and butylmethacrylate, and (c) unsaturated hydrophilic hydrophobic monomers methacrylic acid and 2-hydroxyethyl methacrylate wherein said (b) unsaturated hydrophobic monomers and said (c) unsaturated hydrophilic commoners are present in a combined amount predominant as compared with said (a) at least one chlorinated polyolefin.

2. The film forming grafted copolymer of claim 1, wherein said (a) at least one chlorinated polyolefin is present in an amount of about 5–20% by weight.

3. The film forming grafted copolymer of claim 2, wherein said combined amount of said (b) unsaturated hydrophobic monomers and said (c) unsaturated hydrophilic monomers is 80–95 % by weight.

4. The film forming grafted copolymer of claim 3, wherein said (b) unsaturated hydrophobic monomers are present in an amount of up to about 95 % by weight of said combined amount of said (b) unsaturated hydrophobic monomers and said (c) unsaturated hydrophilic monomers.

5. The film forming grafted copolymer of claim 3, wherein said (c) unsaturated hydrophilic monomers are present in an amount of up to about 40% by weight of said combined amount of said (b) unsaturated hydrophobic monomers and said (c) unsaturated hydrophilic monomers.

6. The film forming grafted copolymer of claim 1, wherein said (a) at least one chlorinated polyolefin is present in an amount of about 5–10% by weight.

7. The film forming grafted copolymer of claim 6, wherein said combined amount of said (b) unsaturated hydrophobic monomers and said (c) unsaturated hydrophilic monomers is 90–95 % by weight.

8. The film forming grafted copolymer of claim 7, wherein said (b) unsaturated hydrophobic monomers are present in an amount of up to about 55 % by weight of said combined amount of said (b) unsaturated hydrophobic monomers and said (c) unsaturated hydrophilic monomers.

9. The film forming grafted copolymer of claim 7, wherein said (c) unsaturated hydrophilic monomers are present in an amount of about 10–40% by weight of said combined amount of said (b) unsaturated hydrophobic monomers and said (c) unsaturated hydrophilic monomers.

10. The film forming grafted copolymer of claim 1, wherein said unsaturated hydrophilic monomers further comprises acrylic acid, dimethylaminoethyl acrylate, dimethylaminoethyl methacrylate, diethylaminoethyl acrylate, diethylaminoethyl methacrylate, and tert-butylaminoethyl acrylate or tert-butylaminoethyl methacrylate.

11. The film forming grafted copolymer of claim 1, wherein said unsaturated hydrophilic monomers further comprises 2-hydroxyethyl acrylate, 2-hydroxypropyl acrylate, 2-hydroxypropyl methacrylate, diethyleneglycol acrylate or diethyleneglycol methacrylate.

12. The film forming grafted copolymer of claim 1, wherein said (b) hydrophobic monomers further comprise an alkyl acrylate, alkyl methacrylate, or butyl acrylate.

13. The film forming grafted copolymer of claim 1, wherein said (b) hydrophobic monomers are about 20 to 60% styrene.

14. The film forming grafted copolymer of claim 1, wherein said chlorinated polyolefin has an average molecular weight (Mw) of between 8,000 and 140,000 and a chlorine content of between 15 and 40%.

15. A film forming grafted copolymer, comprising (a) at least one chlorinated polyolefin having a molecular weight of 8,000 to 140,000 and a chlorine content of 15–40% grafted with (b) about 30% styrene, (c) about 32% butylacrylate, (d) about 13% ethylhexylmethacrylate and (e) 18% methacrylic acid by weight in the final graft copolymer.

* * * * *